(12) United States Patent
Kim et al.

(10) Patent No.: US 8,542,477 B2
(45) Date of Patent: Sep. 24, 2013

(54) MULTILAYER CERAMIC ELECTRONIC PART

(75) Inventors: Wi Heon Kim, Gyunggi-do (KR); Doo Young Kim, Gyunggi-do (KR); Jin Man Jung, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 7 days.

(21) Appl. No.: 13/404,890

(22) Filed: Feb. 24, 2012

(65) Prior Publication Data

US 2013/0135789 A1   May 30, 2013

(30) Foreign Application Priority Data

Nov. 25, 2011   (KR) .................. 10-2011-0124431

(51) Int. Cl.
*H01G 4/06* (2006.01)

(52) U.S. Cl.
USPC ............. 361/321.2; 361/321.1; 361/306.1; 361/306.3; 361/301.4; 361/313

(58) Field of Classification Search
USPC ............. 361/321.2, 321.1, 303–305, 306.1, 361/306.3, 308.1, 311–313, 301.2, 301.4
See application file for complete search history.

(56) References Cited

U.S. PATENT DOCUMENTS

| | | | | |
|---|---|---|---|---|
| 7,339,781 B2 * | 3/2008 | Yoshii et al. | ............. | 361/309 |
| 7,430,107 B2 * | 9/2008 | Fukudome et al. | ......... | 361/306.3 |
| 7,436,650 B2 * | 10/2008 | Oguni et al. | ............. | 361/321.2 |
| 8,194,390 B2 * | 6/2012 | Kim et al. | ............. | 361/321.2 |
| 8,385,048 B2 * | 2/2013 | Ahn et al. | ............. | 361/321.1 |
| 2001/0055192 A1 * | 12/2001 | Nakano et al. | ............. | 361/306.3 |

FOREIGN PATENT DOCUMENTS

| JP | 08-181031 A | 7/1996 |
|---|---|---|
| JP | 2003-022930 A | 1/2003 |

* cited by examiner

*Primary Examiner* — Nguyen T Ha
(74) *Attorney, Agent, or Firm* — McDermott Will & Emery LLP

(57) ABSTRACT

There is provided a multilayer ceramic electronic part, including: a ceramic body including dielectric layers each having an average thickness of 0.6 μm or less; and first and second internal electrodes disposed to face each other within the ceramic body with the dielectric layer interposed therebetween, wherein the ceramic body includes a capacitance forming part and non-capacitance forming parts, and when the capacitance forming part is divided into 2n+1 (n is 1 or more) regions in a thickness direction of the ceramic body, the dielectric layers of the capacitance forming part get thinner in directions from a central region toward upper and lower regions, whereby continuity of the internal electrode may be improved and a high-capacity multilayer ceramic electronic part may be realized.

13 Claims, 4 Drawing Sheets

MULTILAYER CERAMIC ELECTRONIC PART

CROSS-REFERENCE TO RELATED APPLICATIONS

This application claims the priority of Korean Patent Application No. 10-2011-0124431 filed on Nov. 25, 2011 in the Korean Intellectual Property Office, the disclosure of which is incorporated herein by reference.

BACKGROUND OF THE INVENTION

1. Field of the Invention

The present invention relates to a multilayer ceramic electronic part having high capacitance, with excellent reliability.

2. Description of the Related Art

In accordance with the recent trend for the miniaturization of electronic products, the demand for miniaturized multilayer ceramic electronic parts having a high capacitance has increased.

Therefore, in a multilayer ceramic electronic part, dielectric layers and internal electrode layers have been thinned and multilayered through various methods. Recently, the thickness of the dielectric layers has been reduced, and multilayer ceramic electronic parts having an increased number of laminations have been manufactured.

As the thickness of the dielectric layers and the internal electrode layers is reduced in order to realize high capacitance, the thickness of the internal electrode layer may be neither uniform nor continuously maintained, and thus, the internal electrode layer may be partially disconnected, thereby degrading the continuity thereof.

Furthermore, in the case that the internal electrode layer is disconnected, the dielectric layer may be partially thickened or thinned, even in the case that the dielectric layer has a uniform average thickness, thereby deteriorating insulating properties in the regions in which the dielectric layer is thinned, and deteriorating the reliability thereof.

Meanwhile, as the number of laminated layers is increased in order to realize a high capacity, the number of internal electrodes is also increased, and continuity of the internal electrodes is differentiated according to the position of the internal electrode, due to a difference in the amount of residual carbon according to the position of the internal electrode and a difference in sinterability, according to the position of a dielectric layer, resulting in a deterioration in reliability.

SUMMARY OF THE INVENTION

An aspect of the present invention provides a multilayer ceramic electronic part having high capacitance and excellent reliability.

According to an aspect of the present invention, there is provided a multilayer ceramic electronic part, including: a ceramic body including dielectric layers each having an average thickness of 0.6 µm or less; and first and second internal electrodes disposed to face each other within the ceramic body, having the dielectric layer interposed therebetween, wherein the ceramic body includes a capacitance forming part contributing to capacitance formation and a non-capacitance forming part provided on at least one of upper and lower surfaces of the capacitance forming part, and when the capacitance forming part is divided into 2n+1 (n is 1 or more) regions in a thickness direction of the ceramic body, the dielectric layers of the capacitance forming part get thinner in directions from a central region toward an upper region and from the central region toward a lower region.

The upper and lower regions may each have a thickness satisfying 1 to 20% based on the overall thickness of the capacitance forming part in a thickness direction of the ceramic body.

When the capacitance forming part is divided into 3 regions, the central region may be thicker by 1 to 20% than the upper and lower regions.

The first and second internal electrodes each may have an average thickness of 0.6 µm or less.

The first or second internal electrode may have a continuity of 90% or more.

According to another aspect of the present invention, there is provided a method of manufacturing a multilayer ceramic electronic part, including: preparing ceramic green sheets by using a slurry including ceramic powder; forming internal electrode patterns on the ceramic green sheets respectively, by using a conductive metal paste; and laminating and sintering the ceramic resultant green sheets, to form a ceramic body including dielectric layers, and first and second internal electrodes disposed to face each other with the dielectric layer interposed therebetween, wherein the ceramic body includes a capacitance forming part contributing to capacitance formation and non-capacitance forming parts provided on at least one of upper and lower surfaces of the capacitance forming part, and when the capacitance forming part is divided into 2n+1 (n is 1 or more) regions in a thickness direction of the ceramic body, the dielectric layers of the capacitance forming part get thinner in directions from a central region toward an upper region and from the central region toward a lower region.

The upper and lower regions each may have a thickness satisfying 1 to 20% based on the overall thickness of the capacitance forming part in a thickness direction of the ceramic body.

When the capacitance forming part is divided into 3 regions in the thickness direction of the ceramic body, the central region may be thicker than the upper and lower regions by 1 to 20%.

The first and second internal electrodes each may have an average thickness of 0.6 µm or less.

The first or second internal electrode may have a continuity of 90% or more.

The number of laminations of the ceramic green sheets may be 400 or more.

The conductive metal paste may include 40 to 50 parts by weight of metal powder, and a metal for the metal powder may be at least one selected from the group consisting of nickel (Ni), copper (Cu), palladium (Pd), and palladium-silver (Pd—Ag) alloy.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
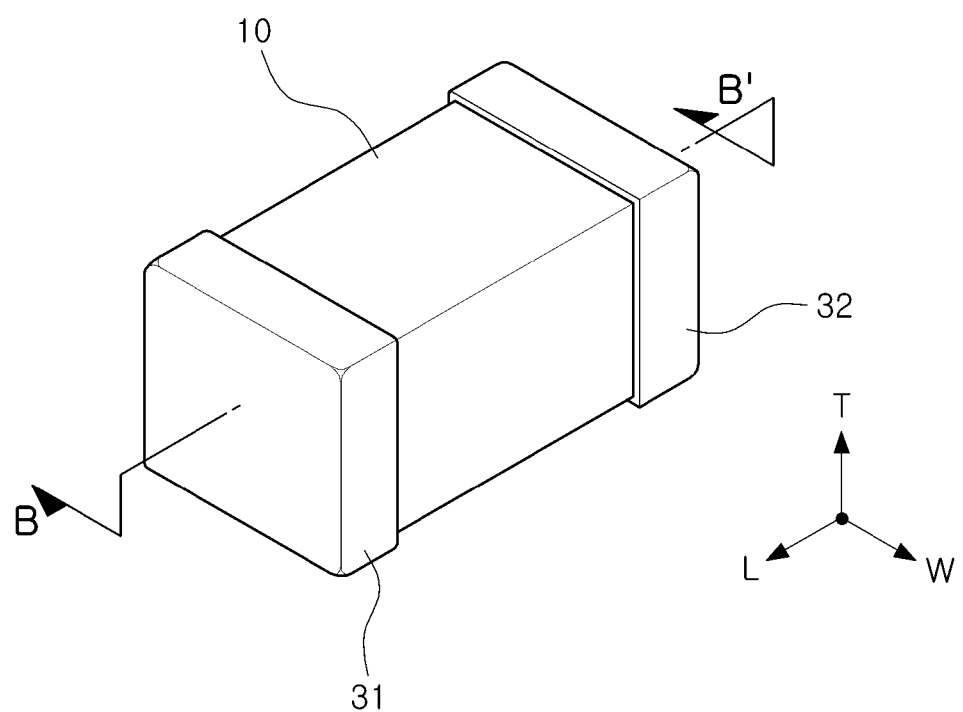
FIG. 1 is a perspective view schematically showing a multilayer ceramic capacitor according to an embodiment of the present invention.

The embodiments of the present invention may be modified in many different forms and the scope of the invention should not be limited to the embodiments set forth herein. The embodiments of the present invention are provided so that those skilled in the art may understand the present invention. In the drawings, the shapes and dimensions may be exaggerated for clarity, and the same reference numerals will be used throughout to designate the same or like components.

Embodiments of the present invention will now be described in detail with reference to the accompanying drawings.

FIG. 1 is a perspective view schematically showing a multilayer ceramic capacitor according to an embodiment of the present invention.

Figure 2:
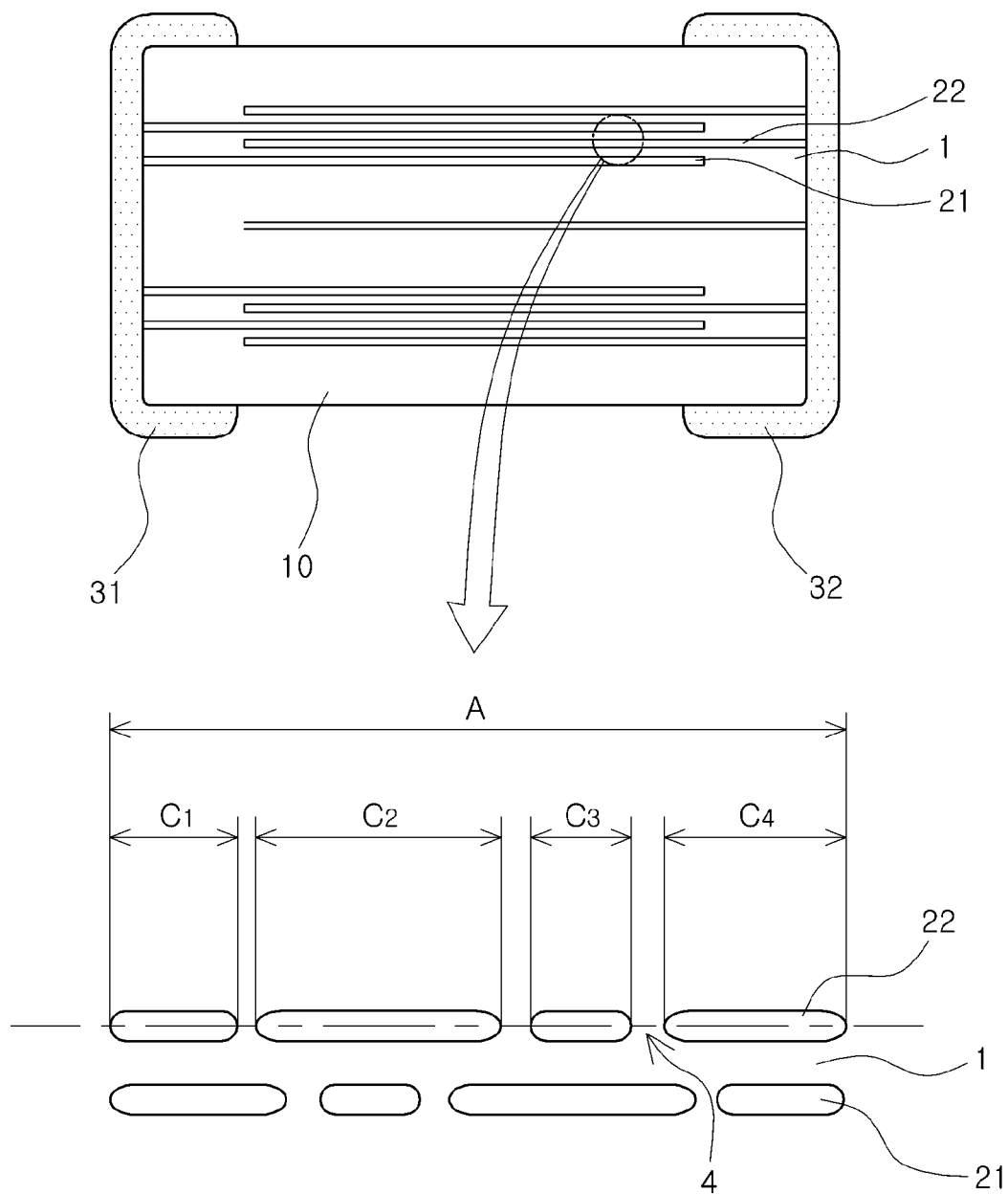
FIG. 2 is a cross-sectional view of FIG. 1 taken along line B-B' and an enlarged view showing continuity of an internal electrode layer.

FIG. 2 is a cross-sectional view taken along line B-B' of FIG. 1 and an enlarged view showing continuity of an internal electrode.

Figure 3:
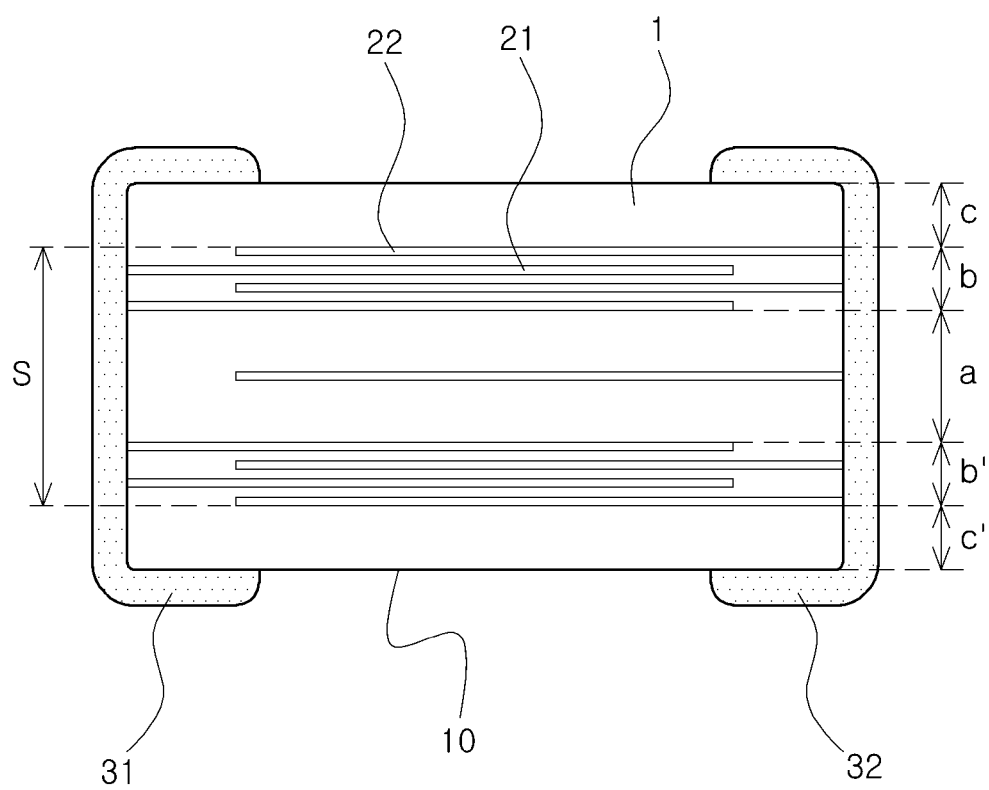
FIG. 3 is a cross-sectional view of FIG. 1 taken along line B-B', schematically showing thicknesses of dielectric layers according to regions thereof.

FIG. 3 is a cross-sectional view taken along line B-B' of FIG. 1, schematically showing thicknesses of dielectric layers according to the regions thereof.

Referring to FIGS. 1 through 3, a multilayer ceramic electronic part according to an embodiment of the present invention may include: a ceramic body 10 including dielectric layers 1 each having an average thickness of 0.6 μm or less; and first and second internal electrodes 21 and 22 disposed to face each other with the dielectric layer 1 interposed therebetween within the ceramic body 10. The ceramic body 10 may include a capacitance forming part S contributing to capacitance formation and non-capacitance forming parts c and c' provided on at least one of upper and lower surfaces of the capacitance forming part. When the capacitance forming part S is divided into 2n+1 (n is 1 or more) regions in a thickness direction of the ceramic body 10, the dielectric layers 1 of the capacitance forming part S may get thinner in directions from a central region a toward upper region b and from the central region a toward lower region b'.

Hereinafter, a multilayer ceramic electronic part according to an embodiment of the present invention, particularly, a multilayer ceramic capacitor, will be described, but the present invention is not limited thereto.

The ceramic body 10 may have, but not particularly limited to, for example, a cuboid shape.

Meanwhile, in the multilayer ceramic capacitor of the present embodiment, a "length direction", a "width direction", and a "thickness direction" may be defined by an 'L' direction, a 'W' direction, and a 'T' direction, in FIG. 1. Here, the 'thickness direction' may be used in the same concept as a direction in which the dielectric layers are laminated, that is, a 'lamination direction'.

The multilayer ceramic capacitor according to an embodiment of the present invention may include a ceramic body including dielectric layers 1 each having an average thickness of 0.6 μm or less; and first and second internal electrodes 21 and 22 formed within the ceramic body 10.

The first and second internal electrodes 21 and 22 may be formed by using a conductive paste formed of at least one of, for example, precious metal materials, such as palladium (Pd), palladium-silver (Pd—Ag) alloy, and the like, nickel (Ni), and copper (Cu), but not particularly limited thereto.

First and second external electrodes 31 and 32 may be formed on outer surfaces of the ceramic body 10 in order to form capacitance, and may be electrically connected with the first and second internal electrodes 21 and 22, respectively.

The first and second external electrodes 31 and 32 may be formed of the same conductive material as the internal electrode, but are not limited thereto. For example, copper (Cu), silver (Ag), nickel (Ni), or the like may be used for the first and second external electrodes 31 and 32.

The first and second external electrodes 31 and 32 may be formed by coating a conductive paste and sintering it, and, here, the conductive paste may be prepared by adding glass frit to the metal powder.

According to an embodiment of the present invention, the average thickness of the dielectric layer 1 may be 0.6 μm or less.

In an embodiment of the present invention, the thickness of the dielectric layer 1 may indicate an average thickness of the electric layer 1 disposed between the first and second internal electrodes 21 and 22.

The average thickness of the dielectric layer 1 may be measured from an image obtained by scanning a cross section in a length direction of the ceramic body 10 using a scanning electron microscope (SEM), as shown in FIG. 2.

For example, as shown in FIG. 2, the average thickness of the dielectric layer 1 may be obtained by measuring the thicknesses of 30 regions that are equidistant in a length direction, on an image of a dielectric layer arbitrarily extracted from the image obtained by scanning a cross section in a length-thickness (L-T) direction, which is cut at a central portion in a width (W) direction of the ceramic body 10, and then calculating an average value of the thicknesses.

The 30 regions of the dielectric layer 1 that are equidistant may be determined in a capacitance forming part that indicates an area in which the first and second internal electrodes 21 and 22 overlap each other.

In addition, when this method of average measurement is extensively performed on ten or more dielectric layers and an average thereof is calculated, the average thickness of the dielectric layer may be more generalized.

According to the present embodiment, the ceramic body 10 may include the capacitance forming part S contributing to capacitance formation, and the non-capacitance forming parts c and c' provided on at least one of upper and lower surfaces of the capacitance forming part S.

When the capacitance forming part S is divided into 2n+1 (n is 1 or more) regions in a thickness direction of the ceramic body 10, the dielectric layers 1 of the capacitance forming part S get thinner from the central region toward the upper region b and the lower region b', and thus, continuity of the internal electrode may be increased, thereby realizing a multilayer ceramic electronic part having excellent withstand voltage characteristics and excellent reliability.

In other words, the continuity of the first and second internal electrodes 21 and 22 may be degraded in a case in which the dielectric layer 1 has an average thickness of 0.6 μm or less. However, according to an embodiment of the present invention, the dielectric layers 1 of the capacitance forming part S get thinner from the central region toward the upper region b and the lower region b', and thus, continuity of the internal electrode may be increased.

In addition, the electrode may be broken in a case in which the dielectric layer 1 has an average thickness of 0.6 μm or less, and thus, the dielectric layer becomes partially thick or thin in spite of the same average thickness of the dielectric layer. Resultantly, insulation characteristics and reliability may be deteriorated at the region in which the dielectric layer may become thinned. However, according to an embodiment of the present invention, continuity of the internal electrode may be increased, and thus, insulation characteristics may be improved.

Whereas, in a case in which the dielectric layer 1 has an average thickness of 0.6 μm or more, there may not be the above defects in insulating characteristics and reliability since the average thickness of the dielectric layer is relatively large.

Therefore, according to an embodiment of the present invention, the dielectric layers 1 of the capacitance forming part S may get thinner from the central region toward the upper region b and the lower region b' when the average thickness of the dielectric layer 1 is 0.6 μm or less, and thus, continuity of the internal electrode may be increased, thereby realizing a multilayer ceramic electronic part having excellent withstand voltage characteristics and reliability.

The thicknesses of the upper region b and the lower region b' are not particularly limited, and for example, they each may have a thickness satisfying 1 to 20% based on the overall thickness of the capacitance forming part in a thickness direction of the ceramic body.

As such, the upper and lower regions each have a thickness satisfying 1 to 20% based on the overall thickness of the capacitance forming part, and thus, continuity of the internal electrode may be increased, thereby implementing a multilayer ceramic electronic part having excellent withstand voltage characteristics and reliability.

When the thicknesses of the upper and lower regions each are below 1% based on the overall thickness of the capacitance forming part, the dielectric layers of the capacitance forming part have an almost uniform thickness, and thus, continuity of the internal electrode may not be increased, thereby failing to improve withstand voltage characteristics and reliability.

When the thickness of each of the upper and lower regions is above 20% based on the overall thickness of the capacitance forming part, a thickness variation in the dielectric layers of the capacitance forming part may be relatively large, and thus, there may be defects in capacitance formation.

When the capacitance forming part S is divided into $2n+1$ (n is 1 or more) regions in a thickness direction of the ceramic body 10, an n value is not particularly limited as long as n is 1 or more, and for example, n may be 1.

In this case, the capacitance forming part is divided into 3 regions in a thickness direction of the ceramic body 10. Here, the thickness of the central region a is not particularly limited, but the central region a may be thicker than the upper regions b and the lower region b' by 1 to 20%.

As such, the central region a is formed to be thicker than the upper region b and the lower region b' by 1 to 20%, and thus, continuity of the internal electrode may be increased, thereby realizing a multilayer ceramic electronic part having excellent withstand voltage characteristics and reliability.

In a case in which the thickness of the central region is below 1% based on the thicknesses of the upper and lower regions, the dielectric layers of the capacitance forming part have an almost uniform thickness, and thus, continuity of the internal electrode may not be increased, thereby failing to improve withstand voltage characteristics and reliability.

In a case in which the thickness of the central region is above 20% based on the thicknesses of the upper and lower regions, a thickness variation in the dielectric layers of the capacitance forming part may be relatively large, and thus, there may be defects in capacitance formation.

The average thickness after sintering of the first and second electrodes 21 and 22 is not particularly limited as long as it can form capacitance, and, for example, may be 0.6 μm or less.

Referring to FIG. 2, in the multilayer ceramic electronic part according to an embodiment of the present invention, continuity of the first or second internal electrode 21 or 22 may be 90% or more.

The continuity of the internal electrode may be defined as a total length of parts that the electrode is actually formed, based on the overall length of the first or second internal electrode 21 or 22.

For example, the continuity of the internal electrode may be measured from an image obtained by scanning a cross section in a length direction of the ceramic body 10 using a scanning electron microscope (SEM), as shown in FIG. 2.

Specifically, as shown in FIG. 2, the continuity of the internal electrode may be obtained by measuring the total length of the parts in which the internal electrode is actually formed based on the entire length of the internal electrode, on an image of an internal electrode, which is arbitrarily extracted from the image obtained by scanning a cross section in a length-thickness (L-T) direction, which is cut at a central region in a width (W) direction of the ceramic body 10, using a scanning electron microscope (SEM).

The continuity of the internal electrode may be measured in the capacitance forming part S that indicates an area in which the first and second internal electrodes 21 and 22 overlap each other.

In addition, when this method for measurement of the continuity of the internal electrode is extensively performed on ten or more internal electrodes at the central region of the cross section in the length-thickness (L-T) direction, and an average thereof is calculated, the continuity of the internal electrode may be more generalized.

Specifically, as shown in FIG. 2, when the overall length of the internal electrode, which is measured at any one region of the first or second internal electrode 21 or 22, is defined as A and lengths of parts in which the internal electrode is actually formed are defined as $c_1, c_2, c_3, \ldots,$ and $c_n$, the continuity of the internal electrode may be expressed by $(c_1+c_2+c_3+ \ldots +c_n)/A$.

In FIG. 2, the parts in which the internal electrode is actually formed are expressed by $c_1, c_2, c_3$ and $c_4$, but the number of parts in which the internal electrode is actually formed is not particularly limited.

In addition, this indicates a coating ratio of the internal electrode, and may be defined as a ratio of an area in which the internal electrode is actually formed, based on the overall area of the internal electrode at the any one region.

The continuity $(c_1+c_2+c_3+c_4/A)$ of the first or second internal electrode 21 or 22 may be variously implemented according to the methods to be later described. In the multilayer ceramic electronic part according to an embodiment of the present invention, the continuity $(c_1+c_2+c_3+c_4/A)$ of the first or second internal electrode 21 or 22 may be 90% or more.

In addition, a disconnected part 4 of the first or second internal electrode 21 or 22 may be a pore or a ceramic material.

In order to realize the continuity $(c_1+c_2+c_3+c_4/A)$ of the first or second internal electrode 21 or 22 to be 90% or more, the particle size of a metal powder in the conductive paste for forming the internal electrode may be varied or the amount of an organic material or a ceramic material may be controlled.

In addition, the temperature rise rate and the sintering atmosphere are controlled during a sintering process, and to thereby control the continuity of the internal electrode.

According to an embodiment of the present invention, in order to implement the continuity of the internal electrode, the thicknesses of the dielectric layers of the capacitance forming part may be differentiated in a thickness direction of the ceramic body.

According to an embodiment of the present invention, the continuity (c1+c2+c3+c4/A) of the first or second internal electrode 21 or 22 may be implemented to be 90% or more, thereby manufacturing a high-capacity multilayer ceramic capacitor having increased capacitance and excellent reliability.

Figure 4:
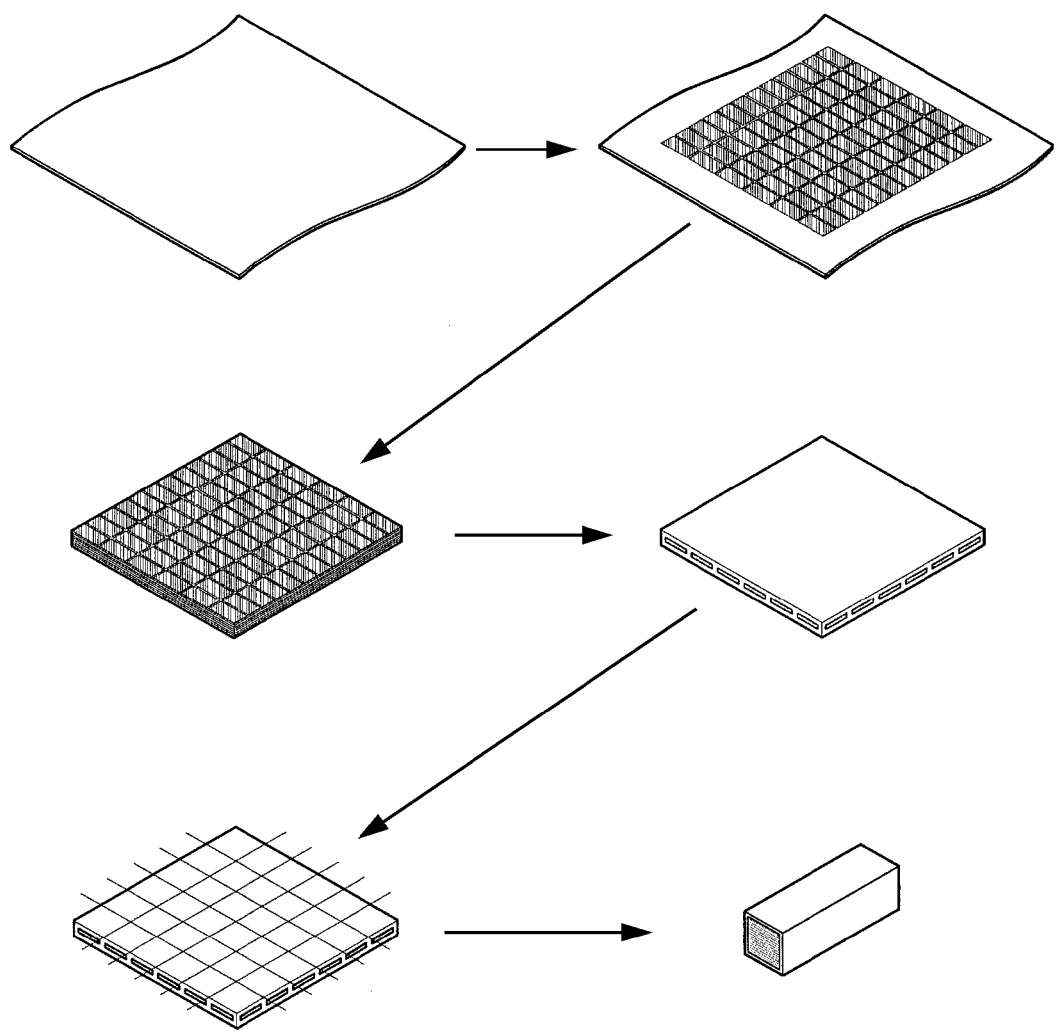
FIG. 4 is a view showing a process of manufacturing a multilayer ceramic capacitor according to another embodiment of the present invention.

FIG. 4 is a view showing a process of manufacturing a multilayer ceramic capacitor according to another embodiment of the present invention.

Referring to FIG. 4, a method of manufacturing a multilayer ceramic electronic part, according to another embodiment of the present invention, may include: preparing ceramic green sheets by using a slurry including ceramic powder; forming internal electrode patterns on the ceramic green sheets respectively, by using a conductive metal paste; and laminating and sintering the ceramic resultant green sheets, to form a ceramic body including dielectric layers, and first and second internal electrodes disposed to face each other with the dielectric layer interposed therebetween, wherein the ceramic body includes a capacitance forming part contributing to capacitance formation and a non-capacitance forming part provided on at least one of upper and lower surfaces of the capacitance forming part, and when the capacitance forming part is divided into 2n+1 (n is 1 or more) regions in a thickness direction of the ceramic body, the dielectric layers of the capacitance forming part may get thinner in directions from a central region toward an upper region and from the central region toward a lower region.

The upper region and the lower region each may have a thickness satisfying 1 to 20% based on the overall thickness of the capacitance forming part in a thickness direction of the ceramic body.

When the capacitance forming part is divided into 3 regions in a thickness direction of the ceramic body, the central region may be thicker than the upper region and the lower region by 1 to 20%.

The average thickness of the first or second internal electrode may be 0.6 μm or less, and the continuity of the first or second internal electrode may be 90% or more.

The number of laminations of the ceramic green sheets is not particularly limited, and may be, for example, 400 layers or more in order to manufacture a high-capacity multilayer ceramic electronic part.

In the case that the number of laminations of the ceramic green sheets is below 400, the dielectric layer and the internal electrode may be relatively thick, and thus, there may not be defects in continuity of the internal electrode and withstand voltage characteristics.

In other words, when the number of laminations is 400 or more, the dielectric layer may be thin, and thus, there may be defects in continuity of the internal electrode, resulting in deteriorated withstand voltage characteristics. According to one embodiment of the present invention, the thicknesses of the dielectric layers may be differentiated according to the regions of the ceramic body, thereby improving continuity of the internal electrode and withstand voltage characteristics.

The conductive metal paste may include, but not particularly limited to, for example, 40 to 50 parts by weight of a conductive powder, and a metal for the conductive metal paste may be at least one selected from the group consisting of nickel (Ni), copper (Cu), palladium (Pd), and palladium-silver (Pd—Ag) alloy.

The method of manufacturing the multilayer ceramic electronic part according to the present embodiment is the same as a general method except that, when the capacitance forming part is divided into 2n+1 (n is 1 or more) regions in a thickness direction of the ceramic body, the dielectric layers of the capacitance forming part get thinner in directions from the central region toward the upper and the lower regions.

The multilayer ceramic electronic part manufactured by the above-described manufacturing method may have increased continuity of the internal electrode, and thus, a multilayer ceramic electronic part having excellent withstand voltage characteristics and reliability may be implemented.

Hereafter, the present invention will be described in detail with reference to examples, but is not limited thereto.

In the present examples, tests were performed on each multilayer ceramic capacitor having dielectric layers 1 with an average thickness of 0.6 μm or less, by dividing a capacitance forming part into 3 regions in a thickness direction of a ceramic body and evaluating the improvement in reliability according to the thickness of the dielectric layer for respective regions.

Each multilayer ceramic capacitor according to the examples was manufactured as follows.

First, a slurry including powder of, for example, barium titanate ($BaTiO_3$) or the like, having an average particle size of 0.1 μm, was coated and dried on a carrier film, to prepare a plurality of ceramic green sheets having a thickness of 1.05 μm or 0.95 μm, and thus, dielectric layers 1 were formed.

Then, a conductive paste for an internal electrode, which includes 40 to 50 parts by weight of a nickel powder having an average particle size of 0.1 to 0.2 μm, was prepared.

The conductive paste for an internal electrode was coated on the ceramic green sheets by a screen printing method, and thereby to form internal electrodes, and then the resulting sheets were laminated in 400 to 500 layers to form a laminate.

Then, compressing and cutting may be performed to produce 1005 standard size chips, and each of the chips was sintered at a temperature of 1050 to 1200° C. under the reducing atmosphere of $H_2$ of 0.1% or less.

Then, an external electrode forming process, a plating process, and the like were performed to manufacture a multilayer ceramic capacitor.

Each sample of the multilayer ceramic capacitor was manufactured such that when the capacitance forming part was divided into 3 regions in a thickness direction of the ceramic body, the dielectric layers of the capacitance forming part got thinner toward the upper region and the lower region from the central region. As results from observing a cross section of the multilayer ceramic capacitor, the internal electrodes resulted in an average thickness of about 0.6 μm and the dielectric layers resulted in an average thickness of 0.3 to 0.8 μm.

Comparative Example was manufactured in the same manner as the above Inventive Examples except that the dielectric layers have a uniform thickness.

Further, the continuity of the internal electrode was determined by measuring the continuity thereof in the capacity forming part, on the cross section in a length-thickness (L-T) direction, which was cut at the central part in a width (W) direction of the laminate body 10. In order to determine the continuity of the internal electrode, the total length of the parts in which the internal electrode is actually formed based on the overall length of the internal electrode was measured, from an image obtained by scanning 10 internal electrodes arbitrarily selected by using the SEM.

Table 1 below shows comparison on continuity of the internal electrode, capacitance, withstand voltage, and high-temperature accelerated lifespan failure rate thereof, according to the thickness of the dielectric layer.

TABLE 1

| Sample | Average Thickness of Dielectric Layer (μm) | | | Capacitance (μF) | Continuity of Internal electrode (%) | | | Withstand Voltage (V) | High-temperature Accelerated Lifespan Failure Rate |
|---|---|---|---|---|---|---|---|---|---|
| | b | a | b' | | b | a | b' | | |
| Comparative Example | 0.6 | 0.6 | 0.6 | 12.7 | 90 | 80 | 90 | 38 | 18 |
| Inventive Example 1 | 0.5 | 0.6 | 0.5 | 13.1 | 90 | 90 | 90 | 45 | 7 |
| Inventive Example 2 | 0.5 | 0.7 | 0.5 | 12.6 | 92 | 90 | 92 | 45 | 2 |

Referring to Table 1, Comparative Example, in which the dielectric layers of the capacitance forming part (b, a, b') have the same average thickness, 0.6 μm, shows that continuity of the internal electrode at the central region is 80%, withstand voltage is relatively low (38V), and high-temperature accelerated lifespan failure rate is relatively high (18). Therefore, it may be seen that there were defects for Comparative Example.

Whereas, Inventive Examples 1 and 2, in which the thicknesses of the dielectric layers of the central regions of the capacitance forming part (b, a, b') are 0.6 μm and 0.7 μm, respectively, and the dielectric layers of the upper and lower regions have the same average thickness, 0.5 μm, show that they are excellent in continuity of the internal electrode, withstand voltage characteristics, and high-temperature accelerated lifespan performance.

Therefore, the multilayer ceramic electronic part according to an embodiment of the present invention are excellent in continuity of the internal electrode, withstand voltage characteristics, and high-temperature accelerated lifespan performance, and thus reliability thereof may be improved.

As set forth above, according to the embodiments of the present invention, the continuity of the internal electrode may be improved while high capacitance is realized, and thus, a high-capacity multilayer ceramic electronic part having excellent accelerated lifespan performance, withstand voltage characteristics, and reliability may be realized.

While the present invention has been shown and described in connection with the above-described embodiments, it will be apparent to those in the art that modifications and variations can be made without departing from the spirit and scope of the invention as defined by the appended claims.

What is claimed is:

1. A multilayer ceramic electronic part, comprising:
   a ceramic body including dielectric layers each having an average thickness of 0.6 μm or less; and
   first and second internal electrodes disposed to face each other within the ceramic body, having the dielectric layer interposed therebetween,
   the ceramic body including a capacitance forming part contributing to capacitance formation and a non-capacitance forming part provided on at least one of upper and lower surfaces of the capacitance forming part, and the dielectric layers of the capacitance forming part being provided to get thinner in directions from a central region toward an upper region and from the central region toward a lower region when the capacitance forming part is divided into 2n+1 (n is 1 or more) regions in a thickness direction of the ceramic body.

2. The multilayer ceramic electronic part of claim 1, wherein the upper and lower regions each have a thickness satisfying 1 to 20% based on the overall thickness of the capacitance forming part in a thickness direction of the ceramic body.

3. The multilayer ceramic electronic part of claim 1, wherein when the capacitance forming part is divided into 3 regions, the central region is thicker by 1 to 20% than the upper and lower regions.

4. The multilayer ceramic electronic part of claim 1, wherein the first and second internal electrodes each have an average thickness of 0.6 μm or less.

5. The multilayer ceramic electronic part of claim 1, wherein the first or second internal electrode has a continuity of 90% or more.

6. A method of manufacturing a multilayer ceramic electronic part, comprising:
   preparing ceramic green sheets by using a slurry including ceramic powder;
   forming internal electrode patterns on the ceramic green sheets respectively, by using a conductive metal paste; and
   laminating and sintering the ceramic resultant green sheets, to form a ceramic body including dielectric layers, and first and second internal electrodes disposed to face each other with the dielectric layer interposed therebetween,
   the ceramic body including a capacitance forming part contributing to capacitance formation and non-capacitance forming parts provided on at least one of upper and lower surfaces of the capacitance forming part, and the dielectric layers of the capacitance forming part getting thinner in directions from a central region toward an upper region and from the central region toward a lower region when the capacitance forming part is divided into 2n+1 (n is 1 or more) regions in a thickness direction of the ceramic body.

7. The method of claim 6, wherein the upper and lower regions each have a thickness satisfying 1 to 20% based on the overall thickness of the capacitance forming part in the thickness direction of the ceramic body.

8. The method of claim 6, wherein, when the capacitance forming part is divided into 3 regions in the thickness direction of the ceramic body, the central region is thicker than the upper and lower regions by 1 to 20%.

9. The method of claim 6, wherein the first and second internal electrodes each have an average thickness of 0.6 μm or less.

10. The method of claim 6, wherein the first or second internal electrode has a continuity of 90% or more.

11. The method of claim 6, wherein the number of laminations of the ceramic green sheets is 400 or more.

12. The method of claim 6, wherein the conductive metal paste includes 40 to 50 parts by weight of metal powder.

13. The method of claim 6, wherein a metal for the metal powder is at least one selected from the group consisting of nickel (Ni), copper (Cu), palladium (Pd), and palladium-silver (Pd—Ag) alloy.

* * * * *